(12) United States Patent
Kasinski et al.

(10) Patent No.: US 12,503,861 B2
(45) Date of Patent: Dec. 23, 2025

(54) ATTIC STAIRS WITH A SUPPORT BEAM

(71) Applicant: FAKRO PP Sp. z o. o., Nowy Sacz (PL)

(72) Inventors: Boguslaw Kasinski, Limanowa (PL); Bartlomiej Mos, Nawojowa (PL)

(73) Assignee: FAKRO PP Sp. z o. o., Nowy Sacz (PL)

( * ) Notice: Subject to any disclaimer, the term of this patent is extended or adjusted under 35 U.S.C. 154(b) by 455 days.

(21) Appl. No.: 18/113,071

(22) Filed: Feb. 23, 2023

(65) Prior Publication Data

US 2023/0304294 A1    Sep. 28, 2023

(30) Foreign Application Priority Data

Mar. 24, 2022   (PL) .......................................... 440747

(51) Int. Cl.
*E04F 11/06*    (2006.01)
(52) U.S. Cl.
CPC .................................. *E04F 11/064* (2013.01)
(58) Field of Classification Search
CPC ....... E04F 11/064; E04F 11/062; E04F 11/06; E06C 7/423; E06C 7/48
See application file for complete search history.

(56) References Cited

U.S. PATENT DOCUMENTS

| | | | | |
|---|---|---|---|---|
| 4,541,508 A | * | 9/1985 | Lundh | E04F 11/064 |
| | | | | 182/78 |
| 6,514,024 B2 | * | 2/2003 | Akema | F16B 19/1081 |
| | | | | 411/908 |
| 6,908,271 B2 | * | 6/2005 | Breslin | F16B 39/023 |
| | | | | 411/57.1 |
| 8,549,724 B2 | * | 10/2013 | Davies | F16B 19/1081 |
| | | | | 411/21 |
| 9,303,674 B2 | * | 4/2016 | Demmeler | F16B 21/18 |
| 9,435,126 B2 | * | 9/2016 | Kasinski | E04F 11/06 |
| 9,540,824 B1 | | 1/2017 | Sandburg | |
| 10,030,686 B2 | * | 7/2018 | Vivier | B29C 45/14377 |

FOREIGN PATENT DOCUMENTS

| | | |
|---|---|---|
| EP | 2474684 A2 | 7/2012 |
| PL | 199927 B1 | 11/2008 |
| PL | 392279 A1 | 3/2012 |
| PL | 396266 A1 | 3/2013 |
| PL | 229816 B1 | 8/2018 |

* cited by examiner

*Primary Examiner* — David E Martinez
(74) *Attorney, Agent, or Firm* — Bayramoglu Law Offices LLC

(57) ABSTRACT

Attic stairs include box, closing hatch for the box and ladder. The ladder is suspended in box using at least one flat bar attached to support beam seated in an upper section of the ladder. The support beam is a profile and each end of the profile has end cap with locking pin locking it in support beam.

4 Claims, 3 Drawing Sheets

ATTIC STAIRS WITH A SUPPORT BEAM

CROSS REFERENCE TO THE RELATED APPLICATIONS

This application is based upon and claims priority to Polish Patent Application No. 440747, filed on Mar. 24, 2022, the entire contents of which are incorporated herein by reference.

TECHNICAL FIELD

The object of the present invention is an attic stairs with a staircase ladder support beam.

BACKGROUND

Attic stairs with a support beam positioned approximately half way along the first segment of the stairs has been disclosed in patent description PL229816B1. The support beam is located in recesses made in lower surfaces of the segment stringers. Locating the beam in a recess makes it possible to minimise the distance between the hatch and the first segment of the stairs in a retracted position. The support beam includes ear brackets which are used, together with bolts, to mount it on the stringers of the first segment of the stairs, on its right and left sides. Both the support beam and the recess in the stringers of the first segment of the stairs are of a rectangular cross-section and are flush with one another without any play, thus making it possible to attach the beam to the stringers using single ear brackets on each side of the stairs segment.

SUMMARY

The aim of the present invention is an attic stairs including a box with a closing hatch on the bottom. The attic stairs include a foldable ladder—scissor like or multi-segment foldable ladder made out of at least two stairs' segments. For multi-segment stairs, the segments are joined using hinge attachments facilitating folding and unfolding. The attic stairs include at least one flat bar for suspending the ladder in the stairs box and to attach the support beam seated under the ladder with the box. The stairs also include a pair of hinges mounted on the inside wall of the box facilitating lowering and raising of the ladder relative to the attic stairs box. The support beam is a profile with end caps inserted into its two ends and for each cap there is a locking pin to lock the attachment between the flat bar and the support beam. The end cap includes a slip sleeve. The end of the flat bar assembly is suspended on the slip sleeve. The end cap is locked to the support beam profile using at least one elastic arm with a ridge. Once the end cap is inserted into the support beam profile, the ridge enters an opening in the support beam profile. Each end cap also includes a seat with clamping arms. The aforementioned locking pin is inserted into the seat, wherein the locking pin features a narrowing terminated with an extension which is flush with the end cap clamping arms. At the same time the locking pin locks the elastic arm with a ridge preventing it from flexing, as the elastic arms are flush with the surface of the locking pin. The other end of the flat bar is attached to the attic stairs box. Furthermore, the stairs ladder is suspended directly or indirectly in the attic stairs box. In the indirect version, the stairs ladder is mounted on the closing hatch joined with the box using the stairs hinges. In the direct version the ladder is mounted to the box and the closing hatch is suspended in the box using the stairs hinges with hanger flat bars joined with brackets attached to the closing hatch. At least two hanger flat bars terminate with hooks attached to brackets facilitating easy detachment of the stairs segment from the closing hatch when in the correct position.

Use of end caps in the attic stairs support beam facilitates simple and quick stairs assembly. Simple support beam design means it may be produced in various sizes and facilitates transport due to their uncomplicated construction. The present invention also delivers a durable and resistant attachment between the flat bars and the support beam.

BRIEF DESCRIPTION OF THE DRAWINGS

The illustration depicts the present invention, with given figures depicting the following.

DETAILED DESCRIPTION OF THE EMBODIMENTS

Figure 1:
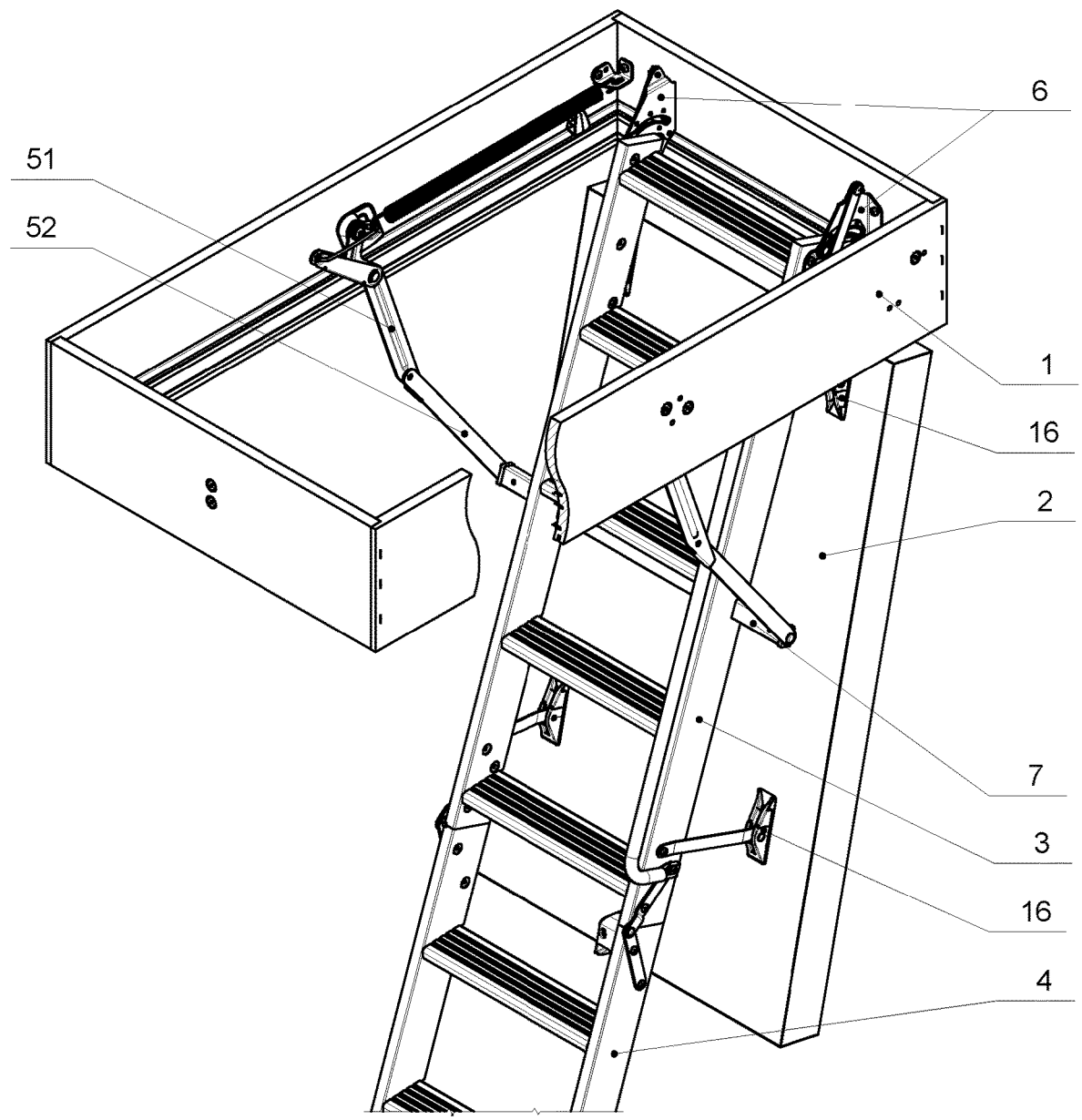
FIG. 1 is a spatial view of the attic stairs.
Figure 2:
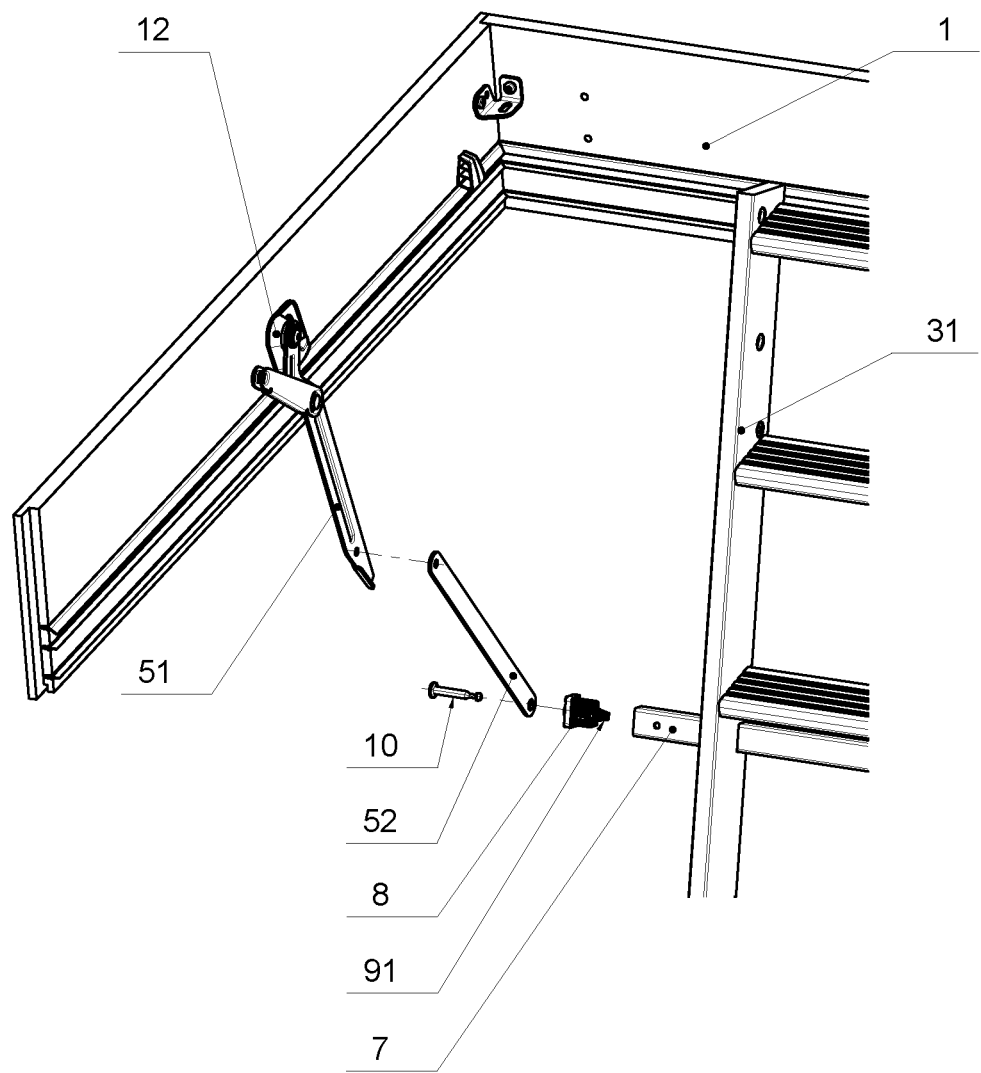
FIG. 2 is an exploded view of a fragment of the attic stairs with a support beam.
Figure 3A:
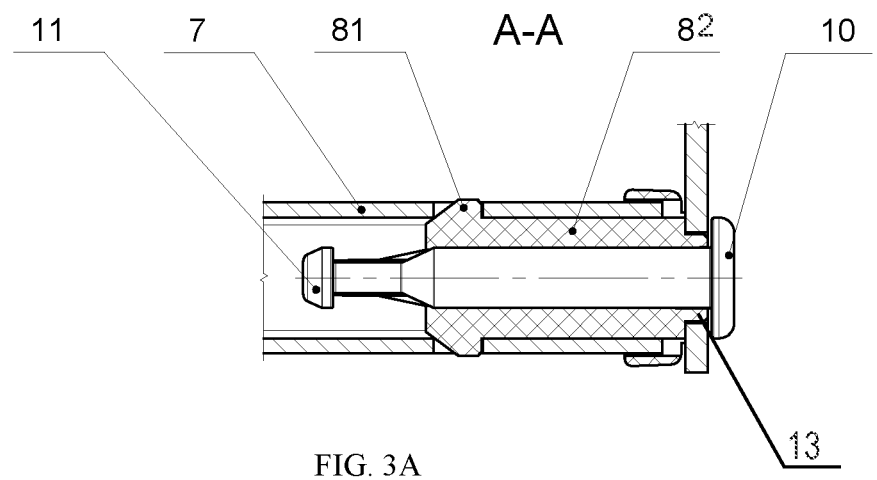
FIGS. 3A and 3B show cross sections of the end cap with a locking pin.
Figure 3B:
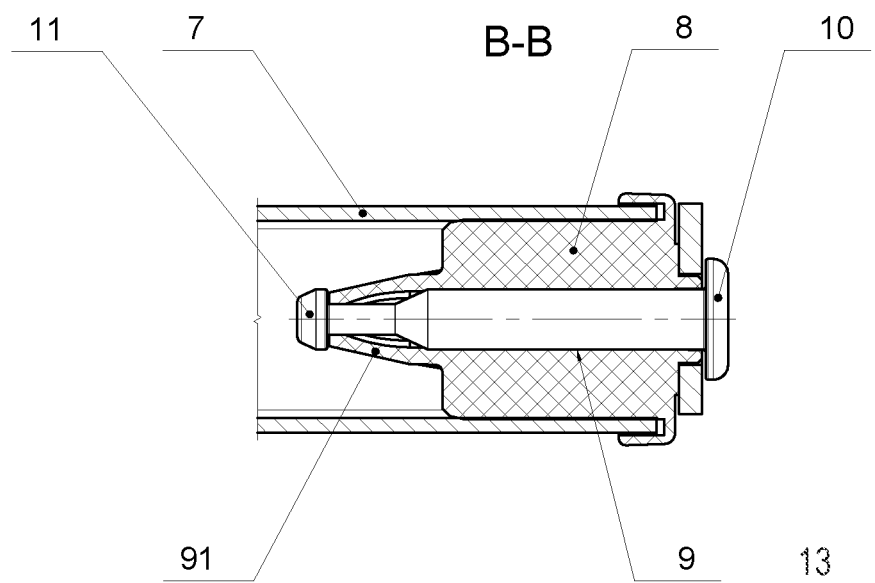

The present invention is depicted in the embodiment of attic stairs with a ladder constructed out of at least two segments of stairs. Attic stairs include a box 1 with a closing hatch 2 on the bottom. At least two segments of stairs 3, 4 are suspended in the box using flat bars 51, 52. Flat bars 51, 52 are attached to the staircase ladder support beam. The stairs also include a pair of hinges 6 mounted on box 1. Hinge 6 includes two hanger flat bars for suspending closing hatch 2 in the box using upper brackets 16 of closing hatch 2. Furthermore, two hanger flat bars of hinge 6 terminate with hooks for a detachable attachment of upper bracket 16 and closing hatch 2. Closing hatch 2 also includes two lower brackets for attachment to the lower hanger flat bars. One end of the hanger flat bars is mounted to stringers of the first segment of the stairs and the other is attached to the lower bracket. Support beam 7 is located under first segment of the stairs 3 and is mounted to stringers 31 of first segment of the stairs 3 using screws. Support beam 7 is a profile with end caps 8 at its ends. End cap 8 includes at least one elastic arm 82 with ridge 81. Upon inserting end cap 8 into support beam 7 profile, ridge 81 is positioned in an opening in support beam 7 locking support beam 7 end cap in place. End cap 8 also includes seat 9 for locking pin 10 via which support beam 7 is attached to flat bar 52. After inserting locking pin 10 into the end cap, elastic arms 82 are flush with locking pin 10 surface. Locking pin 10 is locked in seat 9 using clamping arms 91 flush with locking pin 10 extension 11. At the same time the pin locks elastic arm 82 with ridge 81 preventing it from flexing. Flexible arms 82 of the end cap include stop faces which, once installed, are flush with locking pin 10 surface also locking it against return motion. The other end of flat bar 51 is attached to a base plate seated on an inside wall of the box. The base plate is attached using an attachment to the box. Set of flat bars 51, 52 travels together with attic stairs segments due to rotatable attachments with base plate 12 and slip sleeve 13 of end cap 8.

What is claimed is:

1. Attic stairs comprising a box, a closing hatch for the box and a ladder, wherein the ladder is suspended in the box using at least one flat bar, the at least one flat bar is attached to a support beam, the support beam is seated in an upper section of the ladder, wherein each of two opposite ends of the support beam comprises an end cap and a locking pin, the locking pin is configured to lock the end cap in the support beam;

wherein the end cap comprises a slip sleeve between the support beam and the locking pin, wherein the locking pin locks the end cap in the support beam, wherein a flat bar end is suspended on the slip sleeve.

2. The attic stairs according to claim 1, wherein the end cap comprises at least one elastic arm with a ridge, the ridge is positioned in an opening in a peripheral surface of the support beam, wherein elastic arms of the end cap comprise stop faces, once installed, the stop faces are flush with a locking pin surface, the locking pin surface locks the stop faces against a return motion.

3. The attic stairs according to claim 1, wherein the end cap comprises a seat with clamping arms to clamp the locking pin in the end cap, wherein the locking pin comprises a narrowing terminating with a truncated-cone extension flush with the clamping arms, wherein a space inside the support beam enables the clamping arms to elastically deform and lock on the extension of the locking pin.

4. The attic stairs according to claim 2, wherein the end cap comprises a seat with clamping arms to clamp the locking pin in the end cap, wherein the locking pin comprises a narrowing terminating with a truncated-cone extension flush with the clamping arms, wherein a space inside the support beam enables the clamping arms to elastically deform and lock on the extension of the locking pin.

* * * * *